(12) United States Patent
Kurihara (10) Patent No.: US 11,402,896 B2
(45) Date of Patent: Aug. 2, 2022

(54) DISPLAY APPARATUS AND DISPLAY ACTION CONTROL METHOD

(71) Applicant: CASIO COMPUTER CO., LTD., Tokyo (JP)

(72) Inventor: Tadashi Kurihara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 36 days.

(21) Appl. No.: 17/015,984

(22) Filed: Sep. 9, 2020

(65) Prior Publication Data
US 2021/0081030 A1 Mar. 18, 2021

(30) Foreign Application Priority Data
Sep. 13, 2019 (JP) .............................. JP2019-166964

(51) Int. Cl.
G09G 5/00 (2006.01)
G06F 3/01 (2006.01)
G06F 1/3287 (2019.01)
G04G 21/00 (2010.01)
G06F 1/3234 (2019.01)
G06F 1/16 (2006.01)

(52) U.S. Cl.
CPC .............. *G06F 3/011* (2013.01); *G04G 21/00* (2013.01); *G06F 1/163* (2013.01); *G06F 1/3265* (2013.01); *G06F 1/3287* (2013.01)

(58) Field of Classification Search
CPC ........ G06F 3/011; G06F 1/163; G06F 1/3265; G06F 1/3287; G04G 21/00
USPC ........................................................ 345/156
See application file for complete search history.

(56) References Cited

U.S. PATENT DOCUMENTS

2005/0235229 A1* 10/2005 Ikemoto ................ G06F 1/3203
715/867
2019/0082666 A1* 3/2019 Copeland ............... A01K 83/06

FOREIGN PATENT DOCUMENTS

| CN | 107659986 A | 2/2018 | |
|---|---|---|---|
| JP | 2001-183476 A | 7/2001 | |
| JP | 2004336646 | * 5/2003 | ............... G09G 3/36 |
| JP | 2004-336646 A | 11/2004 | |
| JP | 2006-179619 A | 7/2006 | |
| JP | 2011-053442 A | 3/2011 | |
| JP | 2015-212867 A | 11/2015 | |

OTHER PUBLICATIONS

Chinese Office Action, dated Jul. 19, 2021, for corresponding Chinese Application No. 2020109437071, 21 pages. (With English Translation).
Japanese Office Action, dated Jul. 20, 2021, for Japanese Application No. 2019-166964, 7 pages, (with English translation).

* cited by examiner

*Primary Examiner* — Jennifer T Nguyen
(74) *Attorney, Agent, or Firm* — Seed IP Law Group LLP

(57) ABSTRACT

A display apparatus includes a display which performs digital display; a sensor which detects use of the display apparatus by a user; and at least one processor. The processor controls the display to set a digital display to be in a burn-in prevention state in a first time period. When the sensor detects use in a second time period including the first time period, the processor stops the burn-in prevention state and changes data regarding setting of the first time period.

14 Claims, 7 Drawing Sheets

| TIME PERIOD | USE DETECTION FREQUENCY | | | USE DEGREE |
|---|---|---|---|---|
| | ONE WEEK | TWO WEEKS | ACCUMULATION | |
| 0:30-1:30 | 4 | 1 | 2.21 | 4.94 |
| 1:30-2:30 | 2 | 0 | 1.58 | 2.32 |
| 2:30-3:30 | 1 | 0 | 0.02 | 1.00 |
| 3:30-4:30 | 0 | 0 | 0.05 | 0.01 |
| 4:30-5:30 | 0 | 2 | 0.84 | 1.16 |

FIG. 11

DISPLAY APPARATUS AND DISPLAY ACTION CONTROL METHOD

BACKGROUND

Technical Field

The technical field relates to a display apparatus and a display action control method.

Background Art

There is a display apparatus which performs various display. Display elements are arranged in a digital display screen and each element performs dot display. The digital display screen is driven to perform the various display. In such display apparatus, if the same display content is continuously displayed in the same position for a long period of time, burn-in such as an after image or habit remains according to the type of display element. This may cause problems in later display.

JP 2011-53442 discloses that if a display continues for a long time on a liquid crystal display screen, a voltage corresponding to an inverted image to offset the contents of display on the liquid crystal may be applied when the display is turned off to remove unbalance in polarity.

SUMMARY

To achieve at least one of the abovementioned objects, according to one aspect of the present invention, a display apparatus includes: a display which performs digital display; a sensor which detects use of the display apparatus by a user; and at least one processor, wherein, the processor controls the display to set a digital display to be in a burn-in prevention state in a first time period, and when the sensor detects use in a second time period including the first time period, the processor stops the burn-in prevention state and changes data regarding setting of the first time period.

DETAILED DESCRIPTION OF THE PREFERRED EMBODIMENTS

The embodiments are described below with reference to the drawings.

First Embodiment

Figure 1:
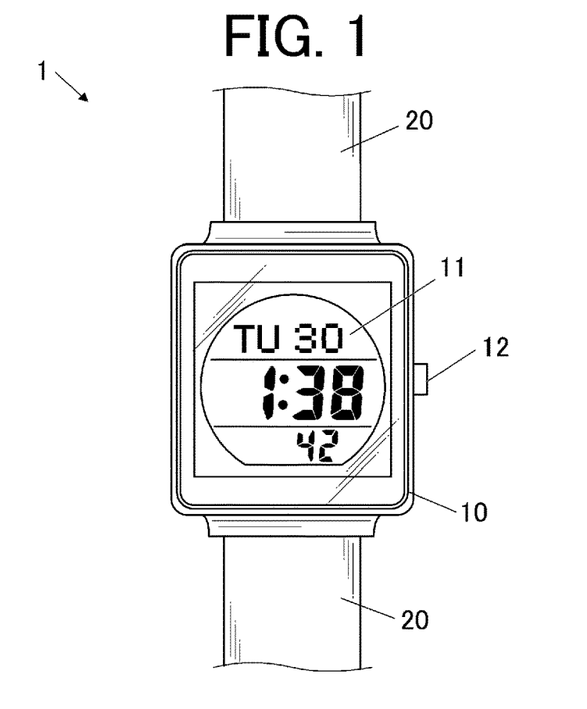
FIG. 1 is a front view of an electronic watch which is a display apparatus according to a first embodiment.

FIG. 1 is a front view of the electronic watch 1 which is a display apparatus according to the first embodiment.

Here, the electronic watch 1 is an electronic wristwatch which includes a main body 10 and a belt 20. The main body 10 includes a display screen 11 and a press button switch 12.

The display screen 11 performs a display (digital display). The digital display can be a dot matrix method or a segment method or a combination of the above. The display screen 11 can be a screen in which once the display is driven and a certain display is performed, the displayed state is maintained without updating action (memory in pixel).

Figure 2:
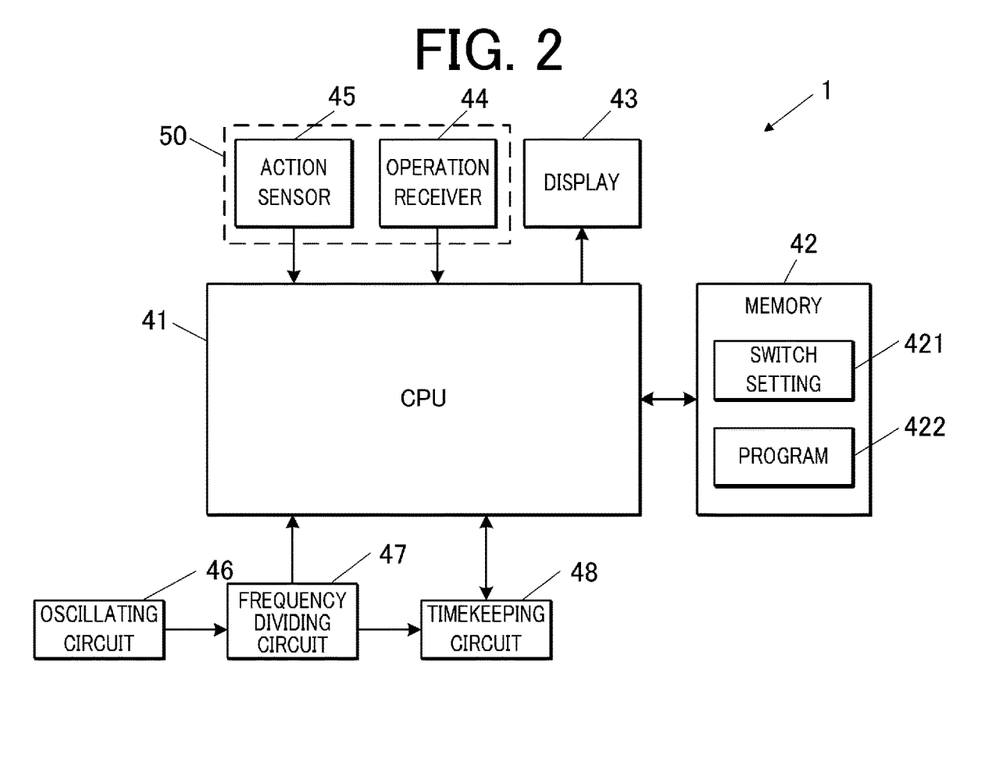
FIG. 2 is a block diagram showing a functional configuration of the electronic watch.

FIG. 2 is a block diagram showing a functional configuration of the electronic watch 1.

The electronic watch 1 includes a Central Processing Unit 41 (CPU) (processor), a memory 42, a display 43, an operation receiver 44, an action sensor 45, an oscillating circuit 46, a frequency dividing circuit 47, and a timekeeping circuit 48 (timekeeper).

The CPU 41 is at least one processor which performs calculating and various action control processes. The CPU 41 performs the later described display erasing control process.

The memory 42 includes a Random Access Memory (RAM) and a nonvolatile memory. The RAM provides a memory space for work to the CPU 41 and stores temporary data. The nonvolatile memory stores setting data and various programs. The nonvolatile memory may include a mask ROM which is not rewritable. The memory 42 stores a switch setting 421. The switch setting 421 is data regarding setting of a time period in which the display of the display screen 11 is turned off, and the contents are described later.

The display 43 includes the above-described display screen 11, and performs digital display on the display screen 11 based on control by the CPU 41. The display contents include the present date/time (time). The CPU 41 can control the display 43 to perform various display regarding various other functions in addition to or temporarily instead of the display of the present time (date/time). A portion of the display of the present date/time for example, a portion or all items other than the hour and the minute can be excluded temporarily from the display of the present date/time.

The operation receiver 44 includes the above-described press button switch 12, and the input operation is detected from outside to be output to the CPU 41 as the input signal. The configuration to receive the input operation is not limited to the press button switch 12. For example, the operation receiver 44 can include a touch panel which is provided overlapped on the display screen 11 or a crown.

The action sensor 45 detects movement of the electronic watch 1. The sensor may be, for example, an acceleration sensor and/or a tilt sensor. The action sensor 45 may include an illuminance sensor. The illuminance sensor may detect external light, especially whether the light is turned on at night to determine the state of usability by the user.

The operation receiver 44 and the action sensor 45 are included in a sensor 50 which detects the use of the electronic watch 1 by the user.

The oscillating circuit 46 generates and outputs a frequency signal (clock signal). Here, the oscillating circuit 46 includes a quartz oscillator. When the clock signal is input from the oscillating circuit 46, the frequency dividing circuit 47 converts the signal to a necessary and desired frequency signal (divides frequency) and outputs the signal to the CPU 41 and the timekeeping circuit 48. The converted and output frequency can be more than one, and the setting can be changed.

The timekeeping circuit 48 counts the signal input from the frequency dividing circuit 47 and counts the present date/time (time and date) and outputs the present date/time to the CPU 41. The highly accurate counting of the date/time can be performed by the CPU 41 and the timekeeping circuit 48 may be a real time clock (RTC). In this case, the CPU 41 is also included in the timekeeping unit in the electronic watch 1 of the present embodiment.

In addition to the above, the electronic watch 1 can include a communicating unit which can transmit and receive radio waves between external devices and/or a satellite radio wave receiver which is able to receive radio waves from positioning satellites to perform positioning processes.

Next, the control in the display erasing action in the electronic watch 1 according to the present embodiment is described.

Basically, the display of the date/time is continued in the electronic watch. However, according to the electronic watch 1 of the present embodiment, a time period in which the user does not use the electronic watch 1 is set for a length, here, one hour, and the display is temporarily turned off (burn-in prevention state). While the display is turned off, when the use by the user is detected, the state immediately returns to the normal display state.

In the electronic watch 1, as the initial setting of the time period in which the display is turned off (first time period), "0:30-1:30" is stored in the switch setting 421. The actual use by the user is determined by detection by the action sensor 45 and the detection of operation on the operation receiver 44. For example, it is determined that there is use in situations such as, when operation on the operation receiver 44 is detected, when the acceleration detected by the acceleration sensor satisfies a standard or a change in the tilt state is detected by the tilt sensor. If a state in which none of the above is performed continues, it is determined that the electronic watch 1 is not used.

According to the electronic watch 1 in the present embodiment, control is performed to turn off the display in a unit of one hour (unit of length of first time period). In the electronic watch 1, from an amount of time before start time of the setting time period set as the time period to be turned off, here, from one hour before, the detection of use starts. If the use is not detected continuously for one hour, the display is actually turned off for one hour. If the use is detected before the time period in which the display is turned off ends, the display state is returned to on if the display is off, and the detection of use starts again in the next one hour. The detection of use can end at the same time as the end of the time period in which the display is turned off. That is, in the electronic timepiece 1 of the present embodiment, the time period in which the detection of use is performed (second time period) is from an amount of time (one hour) before the start time of the time period in which the display is turned off to the stop time of the time period in which the display is turned off.

Figure 3A:
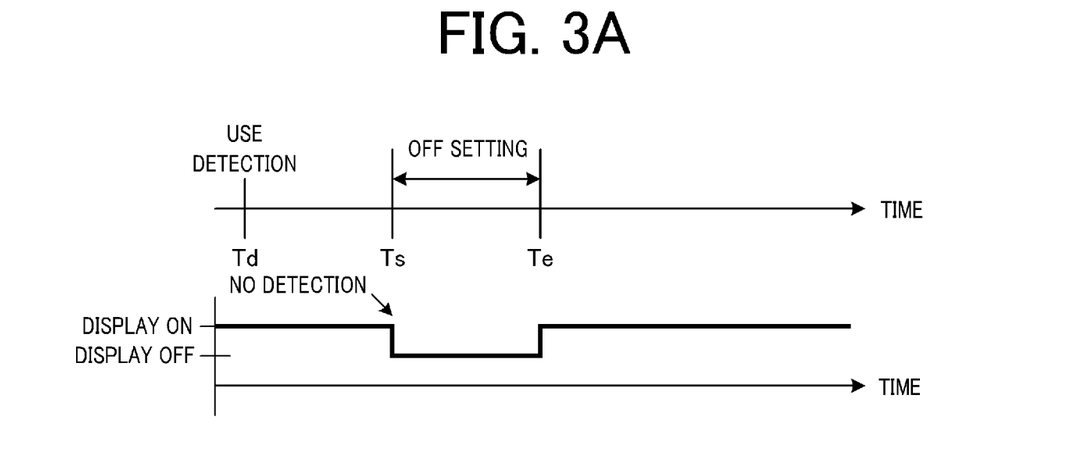
FIG. 3A, FIG. 3B, and FIG. 3C are diagrams showing patterns to change setting regarding a time period in which a display is turned off.
Figure 3B:
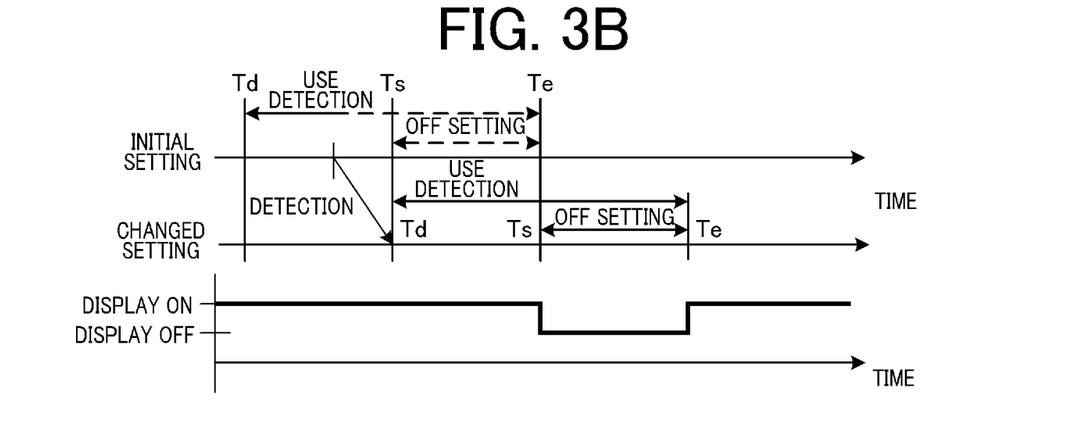
Figure 3C:
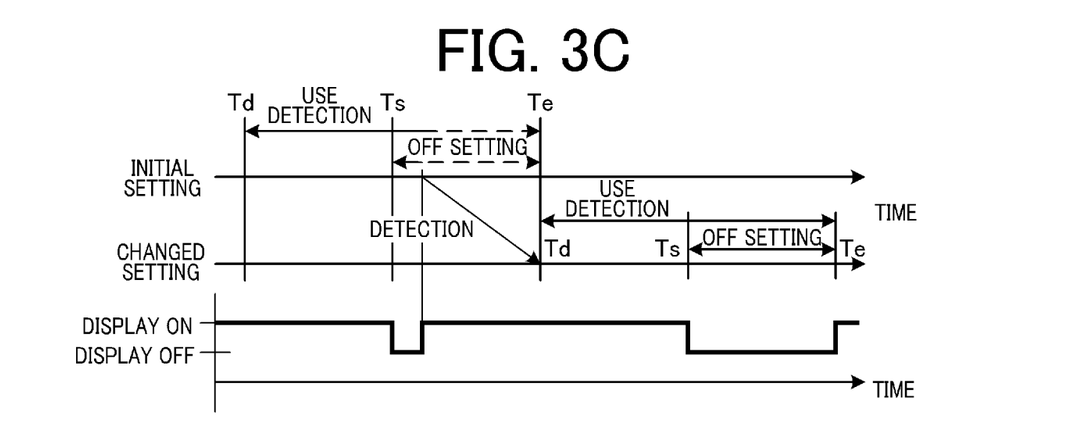

FIG. 3A to FIG. 3C show a pattern to change the setting regarding the time period in which the display is turned off.

According to the electronic watch 1 of the present embodiment, as shown in FIG. 3A, if the use is not detected continuously for an amount of time before the time period that the display is turned off (erase time Ts=t0 (start time of first time period) to return time Te=t0+1 (stop time of first time period)), for example, one hour before (detection time Td=t0−1 (start time of second time period), the display is turned off as scheduled at erase time Ts. If use is not detected between erase time Ts to return time Te, the display being off continues, and the display turns on at return time Te.

As shown in FIG. 3B, if the use is detected from the detection time Td to the erase time Ts in the original setting, the detection time Td, the erase time Ts and the return time Te are each delayed one hour. That is, the detection of use starts again at the delayed detection time Td=t0 and if the use is not detected continuously for one hour, the display is turned off for one hour from the erase time Ts=t0+1, that is, from the original return time Te. From the next day, the display is turned off according to the changed setting time, that is, detection time Td=t0, erase time Ts=t0+1, and return time Te=t0+2.

As shown in FIG. 3C, although the use is not detected from the detection time Td to the erase time Ts in the original setting, if the use is detected from when the display is erased at the erase time Ts to the return time Te (first time period), the display is restarted immediately (off state is stopped). In this case, the delay is two hours to be changed to detection time Td=t0+1, and the action to turn off the display is performed again from the beginning delayed two hours from the original return time Te. From the next day, the display is turned off according to the changed setting time (moved setting), that is, detection time Td=t0+1, erase time Ts=t0+2, and return time Te=t0+3. If the use is detected before the moved time period in which the display is turned off or the use is detected again in the middle, the setting of the time period in which the display is turned off (setting time period) can be further changed.

As described above, according to the electronic watch 1 of the present embodiment, the time period in which the display is turned off is set to be further in the future so that the detection time Td is after the present time.

Figure 4:
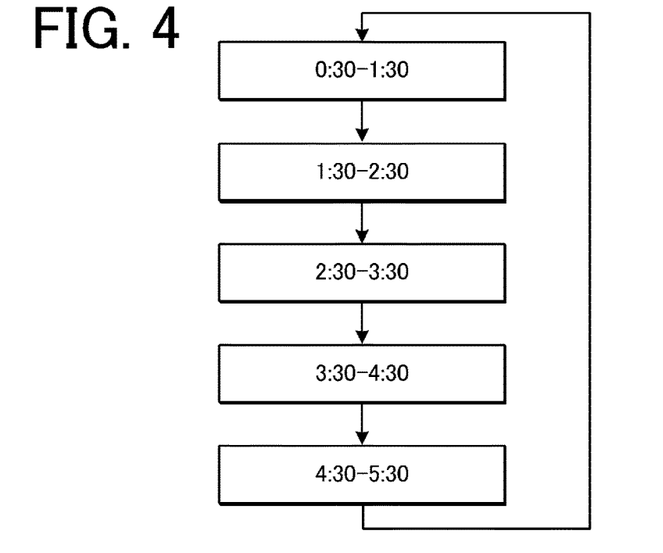
FIG. 4 is a diagram which describes an example of patterns to which the setting regarding the time period in which the display is turned off can be changed.

FIG. 4 is a diagram describing an example of patterns to which the time period in which the display is turned off can be changed.

As described above, the setting of the time period in which the display is turned off is delayed in a unit of one hour (as described above, sometimes delayed two hours at once) and it may be determined to not perform the setting to turn off the display in the time period during the day. For example, the time period (third time period) that the time period in which the display is turned off can be set may be limited to the range 0:30 to 5:30. When the time period in which the display is turned off is set to 4:30 to 5:30 (erase time 4:30) and the use is detected after 3:30, instead of setting the erase time Ts to 5:30, the erase time Ts can be changed to the next night time, for example, 0:30, that is, the start of the third time period (moved setting).

The setting of the time period in which the display is turned off is applied to the local time. That is, when the user moves to a time zone with a different local time, the same setting of the time period can be referred for the local time where the user moved to and the above process can be performed.

Figure 5:
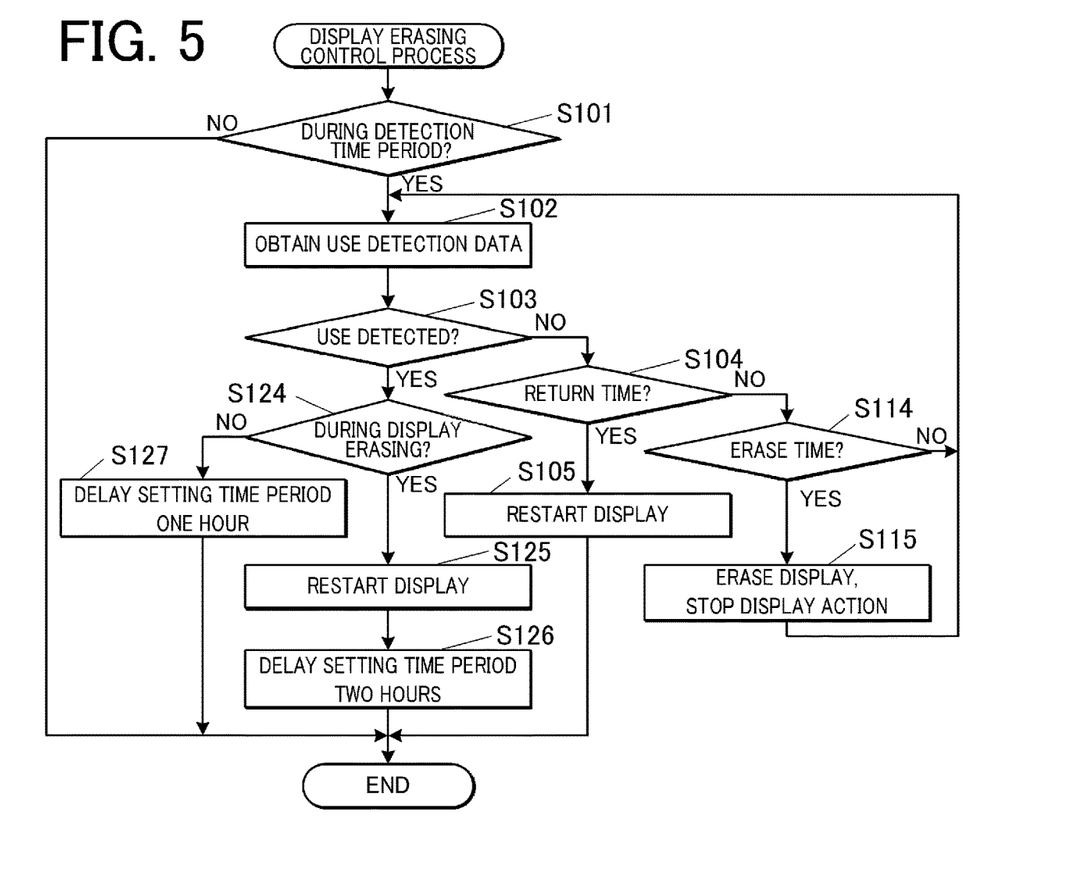
FIG. 5 is a flowchart which shows a control procedure of a display erasing control process performed in the electronic watch according to a first embodiment.

FIG. 5 is a flowchart showing a control procedure by the CPU 41 for the display erasing control process performed by the electronic watch 1. The display erasing control process is called at 0 minutes each hour and started. The display erasing control process includes the display action control method according to the present embodiment.

When the display erasing control process starts, the CPU 41 determines whether it is during the detection time period, that is, from the detection time Td which is one hour before the erase time Ts to the return time Te (both ends inclusive) (step S101). When it is determined that it is not during the detection time period ("NO" in step S101), the CPU 41 ends the display erasing control process.

When it is determined that it is during the detection time period ("YES" in step S101), the CPU 41 obtains the detection data of the use situation from the action sensor 45 (step S102). The CPU 41 determines whether the used state is detected (step S103). When it is determined that the used state is not detected ("NO" in step S103), the CPU 41 determines whether it is the return time Te of the setting time period in which the display is turned off. When it is determined that it is the return time Te ("YES" in step S104), the CPU 41 restarts the display on the display 43 (step S105). Then, the CPU 41 ends the display erasing control process.

When it is determined that it is not the return time Te of the setting time period in which the display is turned off ("NO" in step S104), the CPU 41 determines whether it is the display erase time Ts, that is, the start time of the setting time period in which the display is turned off (step S114). When it is determined that it is the erase time Ts ("YES" in step S114), the CPU 41 erases the display contents on the display 43 and stops the display action (step S115). Then, the process by the CPU 41 returns to step S102. When it is determined that it is not the erase time Ts ("NO" in step S114), the process by the CPU 41 returns to step S102.

In the determining process in step S103, when it is determined that the used state is detected ("YES" in step S103), the CPU 41 determines whether the display on the display 43 is erased (step S124). When it is determined that it is erased ("YES" in step S124), the CPU 41 restarts the display on the display 43 (step S125). The CPU 41 delays the present setting time period regarding the display off (erase time Ts and return time Te) for two hours (step S126). Then, the CPU 41 ends the display erasing control process.

When it is determined that the display by the display 43 is not erased ("NO" in step S124), the CPU 41 delays the present setting time period regarding the display off (erase time Ts and return time Te) for one hour (step S127). Then, the CPU 41 ends the display erasing control process.

The processes in steps S104, S105, S114, and S115 are included in the action step in the display action control method according to the present embodiment. The processes in steps S125 to S127 are included in the setting change step in the display action control method according to the present embodiment.

According to the present embodiment, the display is turned off in the time period which is set, however, another display which can prevent the burn-in can be displayed.

Figure 6:
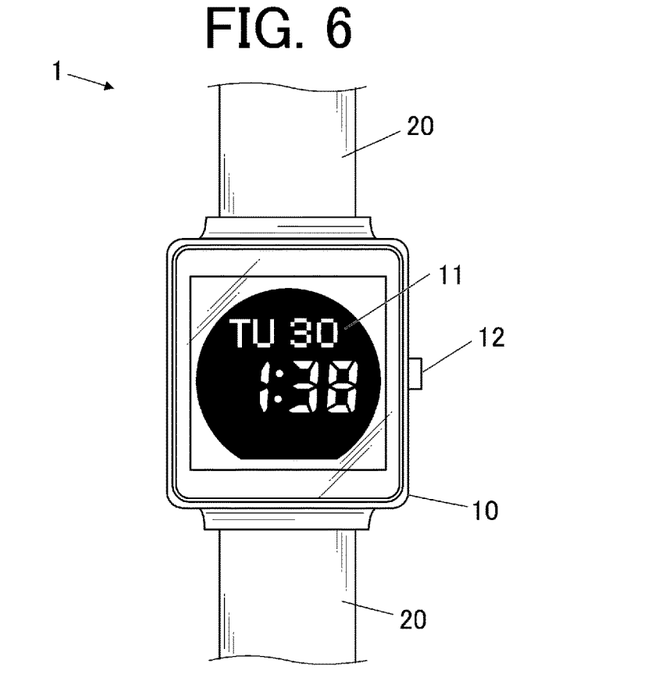
FIG. 6 is a diagram showing another example of a display regarding preventing burn-in on the display screen.

FIG. 6 is a diagram showing an example of another display regarding preventing burn-in on the display screen 11. As shown here, during the setting time period, the display 43 can perform a display with the gradation value of the display inverted from the normal value. According to such display, the consumed power increases compared to turning off the display on the display 43, but the display of the date/time continues. Alternatively, although the display of the date/time is cut, the pixels can be controlled so that all of the pixels which are turned on for an amount of time or more from the previous setting time period to the present setting time period can be inverted.

Second Embodiment

Next, the electronic watch according to the second embodiment is described. In the electronic watch according to the present embodiment, if the use is detected for a number of days, here two consecutive days, during the detection time period corresponding to the time period in which the display is turned off, and the time period in which the display is turned off is changed, the time period in which the display is turned off is moved and set.

Figure 7:
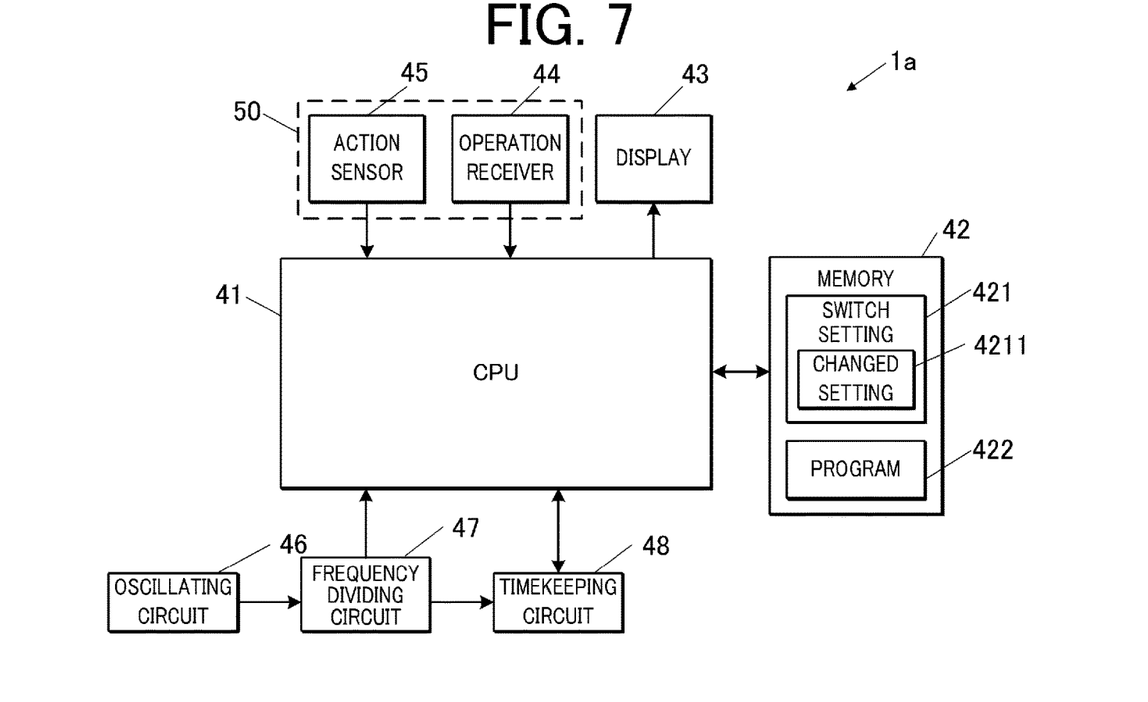
FIG. 7 is a block diagram showing a functional configuration of the electronic watch according to a second embodiment.

FIG. 7 is a block diagram showing a functional configuration of the electronic watch 1a according to the second embodiment.

The electronic watch 1a has the same configuration as the electronic watch 1 with the exception that the switch setting 421 includes a changed setting 4211. The same reference numerals are applied to the same configuration and the description is omitted.

The changed setting 4211 shows in a unit of days whether the time period in which the display is turned off was changed from the initial setting on the day when the display was turned off the previous time.

Figure 8:
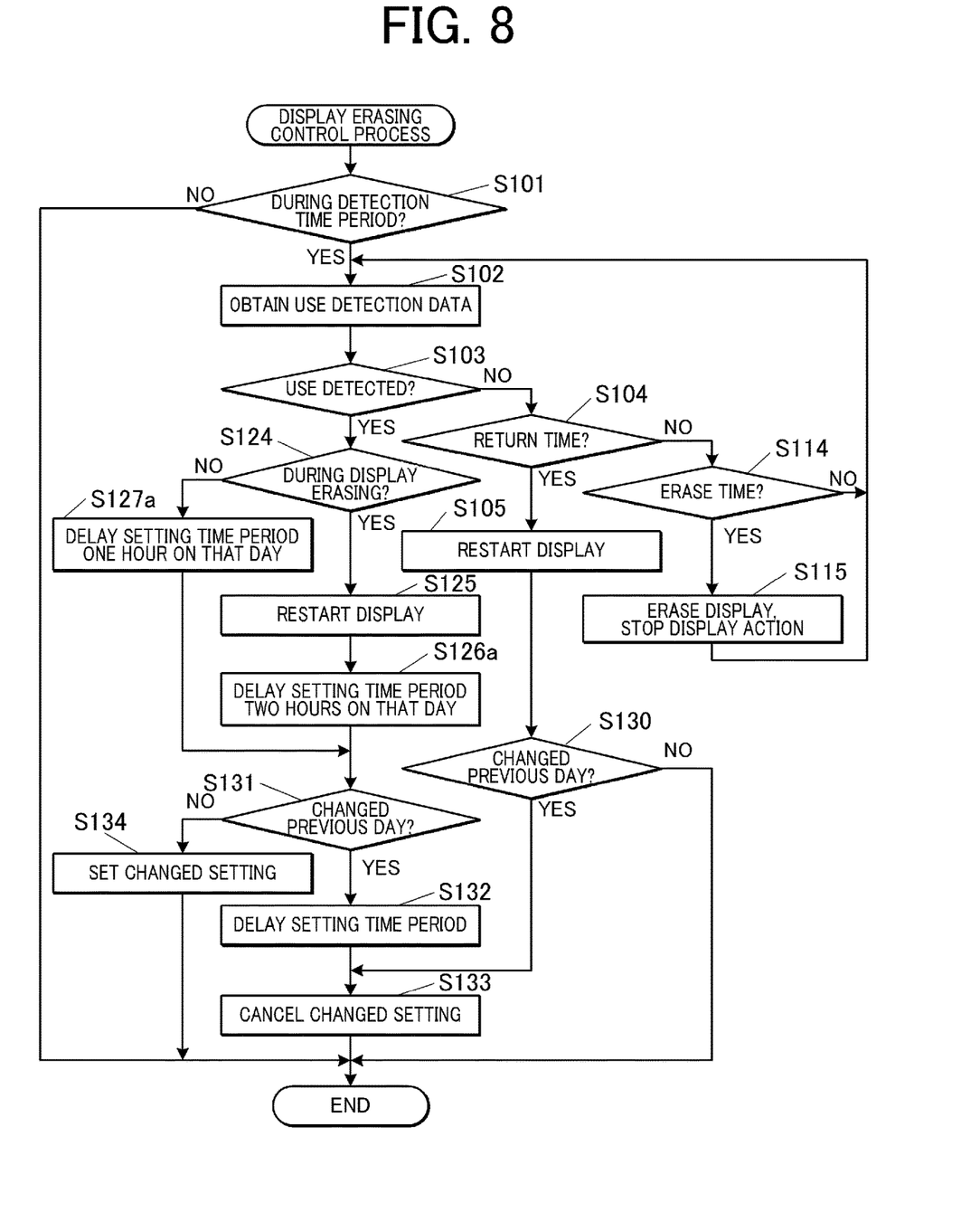
FIG. 8 is a flowchart showing a control procedure in the display erasing control process performed in the electronic watch according to the second embodiment.

FIG. 8 is a flowchart showing a control procedure by the CPU 41 in the display erasing control process performed by the electronic watch 1a according to the present embodiment. In the display erasing control process, the process in steps S130 to S134 are added to the display erasing control process performed by the electronic watch 1 according to the first embodiment. Further, the processes in steps S126 and S127 are exchanged with the processes in steps S126a and S127a. The other processes are the same in the first and second embodiments. The same reference numerals are applied to the same processes and the description is omitted.

In the process in step S105, after ending the erasing of the display (off state) normally, and restarting the display, the CPU 41 refers to the changed setting 4211 and determines whether the setting time period in which the display is turned off is changed the previous day (step S130). When it is determined that there is a change ("YES" in step S130). The CPU 41 releases the changed setting (step S133). Then, the CPU 41 ends the display erasing control process. When it is determined that there is no change in the setting time period in which the display is turned off ("NO" in step S130), the CPU 41 ends the display erasing control process.

When it is determined that the determination process in step S124 is not during the erasing of the display, and the flow proceeds to "NO", the CPU 41 delays the setting time period in which the display is turned off on that day for one hour (step S127a). Then, the process by the CPU 41 proceeds to step S131. When it is determined that it is during the erasing of the display, and the flow proceeds to "YES", the CPU 41 restarts the display in the process of step S125 and delays the setting time period in which the display is turned off on that day for two hours (step S126a). Then, the process by the CPU 41 proceeds to step S131.

When the process proceeds to step S131, the CPU 41 refers to the changed setting 4211 and determines whether the setting time period in which the display is turned off is changed the previous day (step S131). When it is determined that it is changed ("YES" in step S131), the CPU 41 performs the setting to delay the setting time period in which the display is turned off to the time delayed in step S126a or step S127a (one hour or two hours) (step S132). Alternatively, the CPU 41 can uniformly delay the setting time period for one hour. Then, the process by the CPU 41 proceeds to step S133.

In the determination process in step S131, when it is determined that there is no change in the setting time period in which the display is turned off the previous day ("NO" in step S131), the CPU 41 sets that there is change in the changed setting 4211 (step S134). Then, the CPU 41 ends the display erasing control process.

That is, when the use is detected in the detection time period, the setting time period in which the display is to be turned off for the day in which detection is performed is changed so that the start time of the detection time period is to be after the present time similar to the electronic watch 1 according to the first embodiment. However, when moved only once, the moved setting is not reflected from the next day and after. When the use is irregular due to a special event, it is expected that the user will return to the normal used state from the next day and after. Since the moved setting is not performed immediately, the normal suitable setting can be maintained more easily. Similar to the first embodiment, when the time period that the time period in which the display is off can be set is limited, the time period in which the display is turned off is not set for that day, and this is not reflected to the initial setting for the next day. Therefore, when the use is detected continuously in the detection time period, the display is not turned off for the number of days (here, two days), until the moved setting is performed. The conditions that such situation occurs is limited, and as a whole, it is possible to secure time to turn off the display sufficiently compared to conventional cases.

Third Embodiment

Next, the electronic watch 1b according to the third embodiment is described.

Figure 9:
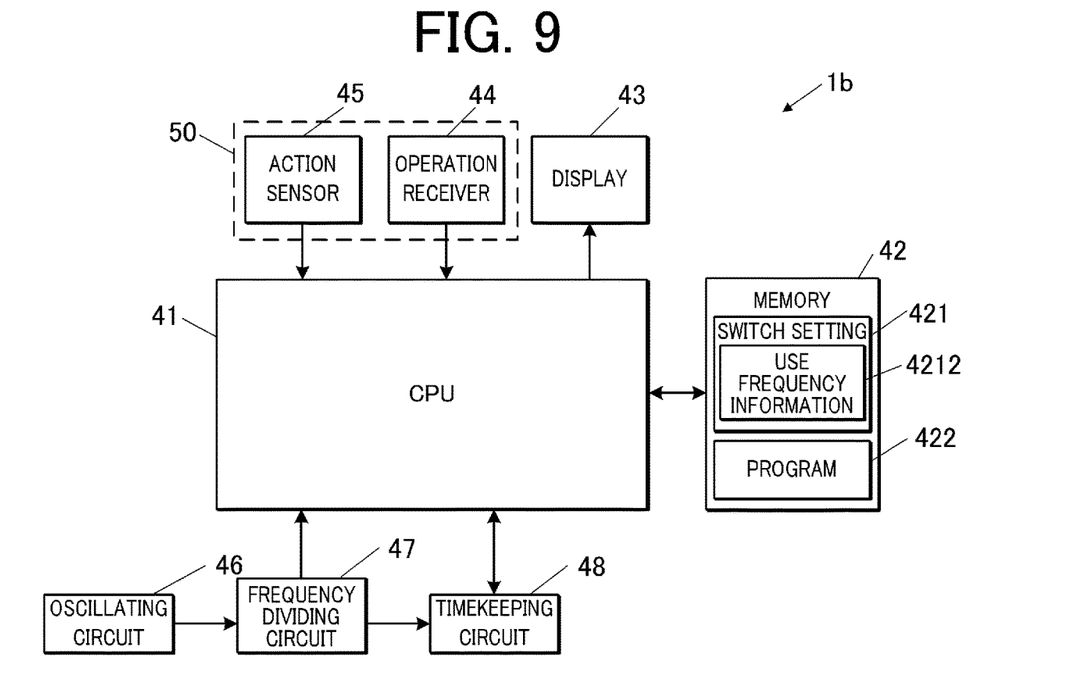
FIG. 9 is a block diagram showing a functional configuration of the electronic watch according to a third embodiment.

FIG. 9 is a block diagram showing a functional configuration of the electronic watch 1b according to the third embodiment.

According to the electronic watch 1b of the third embodiment, use frequency information 4212 is included in the switch setting 421. With the exception of this point, the configuration of the electronic watch 1b is the same as the electronic watch 1. The same reference numerals are used for the same configurations, and the description is omitted.

The use frequency information 4212 stores the number of times of detection in the used state in each time period which is set or which can be set as the detection time period.

Figure 10:
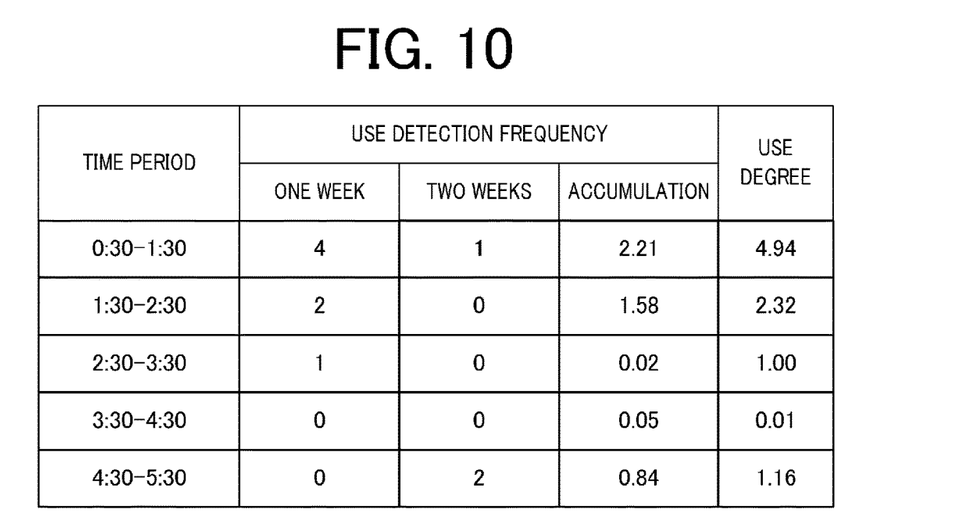
FIG. 10 is a diagram showing an example of contents of use frequency information.

FIG. 10 is a diagram showing an example of contents of the use frequency information 4212.

The frequency of detection of the used state is stored for each of the five time periods which can be set as the detection time period. The detection frequency includes each of the following, the number of times of detection in the previous week (day before to 7 days before), the number of times of detection two weeks before (8 days before to 14 days before), and weighted calculated value of the number of times of detection before the above (15 days or more before). Therefore, for example, the detection frequency can be stored separately for each day for the previous two weeks. In order to count all situations of use for each time period which can be set as the detection time period, the used state can be detected continuously every day for all time periods (here, 23:30 to 5:30) separately from the detection time period setting for erasing the display. The detection of the used state in the time period other than the detection time period does not influence the setting time period regarding erasing the display on the day of detection.

The accumulated use frequency and use degree (index regarding detection frequency) are calculated with the weighted added value. For example, the accumulated value can be updated each time the date changes by adding the use frequency 15 days before with the value multiplying the weighted coefficient (for example, 0.9) to the accumulated value stored at this point. The use degree can be obtained by adding the value one week before, the value multiplying a first coefficient (0.5) to the value two weeks before, and the value multiplying a second coefficient (value smaller than the first coefficient, for example, 0.2) to the accumulated value. With this, the detection result closer to the present can be weighted larger, and the influence of the old detection result can be decreased while quantitatively evaluating the degree of the use frequency.

In the electronic watch 1b, when the used state is detected in the detection time period, the use frequency information 4212 is referred, and the setting time period is changed to the time period with the lowest use degree at present. Limited to the day in which the use is detected, while delaying one hour or two hours similar to the first embodiment, if there is a time period in which the used state cannot be detected, the display is erased for one hour. Even if the used state is detected and the use degree is updated, if the use degree in the same time period is still minimum, the setting time period does not have to be changed. Alternatively, in this case only, the setting time period can be changed to the time period with the second smallest use degree.

Figure 11:
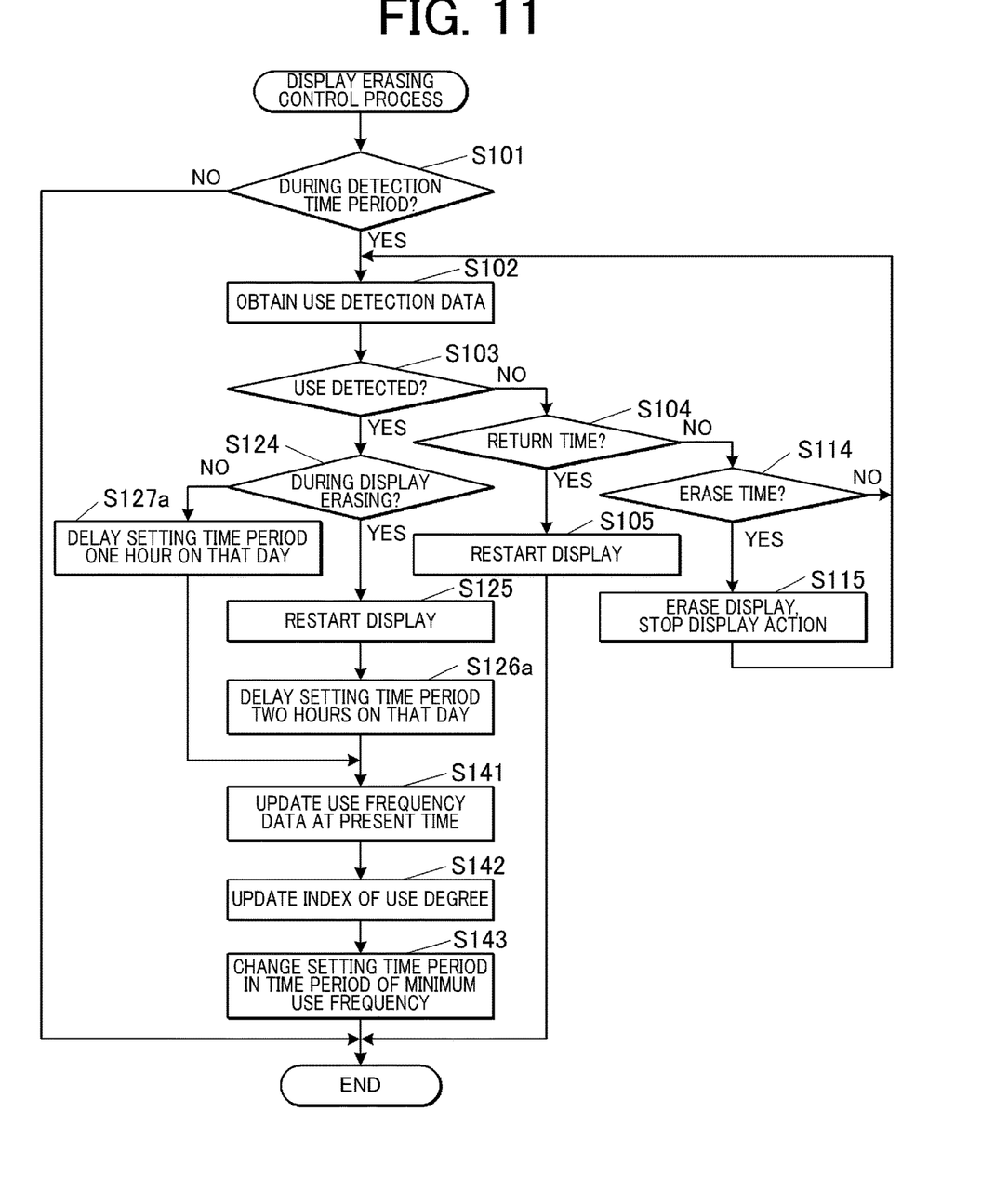
FIG. 11 is a flowchart showing a control procedure of a display erasing control process performed in the electronic watch according to the third embodiment.

FIG. 11 is a flowchart showing the control procedure by the CPU 41 in the display erasing control process performed by the electronic watch 1b according to the present embodiment.

In this display erasing control process, the processes in steps S126 and S127 in the display erasing control process according to the electronic watch 1 of the first embodiment are replaced with the processes in steps S126a and S127a performed in the electronic watch 1a of the second embodiment, and the processes in steps S141 to S143 are added. The other processes are the same in the electronic watch 1 of the first embodiment and the electronic watch 1b of the third embodiment. The same reference numerals are applied to the same processing contents and the detailed description is omitted.

When the processes in steps S126a and S127a end, the process in the CPU 41 proceeds to step S141. In the process in step S141, the CPU 41 adds one and updates the use frequency of the present time period (step S141). The CPU 41 updates the value of the use degree (step S142). The CPU 41 changes the setting time period to the time period with the lowest use degree in the use frequency information 4212 (step S143). Then, the CPU 41 ends the display erasing control process.

As described above, the electronic watches 1, 1a, and 1b according to the present embodiments include a display 43 which performs a digital display on the display screen 11, a sensor 50 which detects use of the watch by the user (action sensor 45 and operation receiver 44), and a CPU 41. The CPU 41 controls the display 43 to set the digital display to a burn-in prevention state, for example, an off state in the first time period set as the time period in which the display is turned off. When the sensor 50 detects use in the detection time period including the first time period, the off state is stopped, and the switch setting 421 which is data regarding the setting of the first time period is changed and updated.

Normally, the pausing of the display on the display screen 11 is not assumed and to move the fixed display contents on the display screen 11 is difficult. However, as described above, the display is turned off an amount of times at the timing that the user does not use the electronic watch, for example, nighttime. Therefore, the needs of the user who desires constant display is satisfied, and the burn-in can be suppressed without decreasing convenience. The time period that the user does not use the electronic watch is different depending on the user. Moreover, the habits of the user may change and the user may use the electronic watch at an irregular time period in which the user does not normally use the electronic watch. Therefore, when the use is detected, the display is returned to the normal display immediately, and the time period in which the burn-in state is prevented can be changed. Electronic watches are used by individuals so there is always a timing that the electronic watch is not used, for example, when the user is sleeping. Therefore, by adjusting the optimal time period, it is possible to prevent occasions in which the user cannot know the present time immediately while suppressing burn-in effectively.

The detection time period is from one hour before the start time of the setting time period in which the display is turned off to the stop time of the setting time period. That is, the display is actually turned off one hour after the time period in which the user is not using the electronic watch is maintained stably. Therefore, even if the time that the user goes to sleep or the time that the user goes out shifts slightly, it is possible to reduce the possibility that the user actually sees the display off state.

The CPU 41 sets the time period in which the display is turned off within the range of the third time period. For example, normally no use during the day is not assumed. Therefore, it is possible to set so that the display is not turned off during the day, here, 5:30 to 24:30 (0:30 next day). With this, there is no need to perform unnecessary use detection action during the day and there is no need to store the history.

When the CPU 41 detects the use of the electronic watch in the detection time period, the time period in which the display is turned off is moved and set. That is, if the use is detected in the time period in which there was no use before and the display was turned off, the time period in which the display is turned off can be changed immediately. With this, it is possible to immediately cope with the change in the situation of use by the user.

The CPU 41 determines the amount of time moved for the setting time period in which the display is turned off in the moved setting by a unit of the amount of time of the time period in which the display is turned off (one hour). That is, the time period in which the display is turned off is not determined at an arbitrary timing, and the time period is moved in a unit of one hour. Therefore, the processing is easy. Moreover, the time period used by the user is not always strictly the same every day. Therefore, there is no merit in fine setting.

When the use of the apparatus is detected during the detection time period, the CPU 41 performs a moved setting and delays the time period in which the display is turned off so that the start time of the detection time period becomes later than the present time. That is, the detection time period is reset to be after the present time so that the time period in which use is detected is not in the detection time period. The time in which the display is turned off can be delayed while detecting the use with the same standards as normal.

When it is not possible to delay the time period in which the display is turned off within the range of the third time period in which the display can be turned off, the CPU 41 moves and sets the start time of the time period in which the display is turned off to the start of the third time period. That is, when delayed to the end of the range and further delay is not possible, the setting is returned to the earliest time period and adjustment is performed again. If the time is delayed too much temporarily, the time period in which the display is turned off can be set to a suitable time again. If the habits of the user changes such as day and night reversing, the display can be suitably turned off according to the above.

In the electronic watch 1b according to the third embodiment, the CPU 41 counts the use detection frequency in the detection time period and stores the above as use frequency information 4212 in the data (switch setting 421). When the use of the electronic watch is detected in the detection time period, the time period in which the display is turned off is set based on the detection frequency. That is, by storing the use history, instead of simply delaying the time period in which the display is turned off, the setting can be made to suitably turn off the display in the least used time period.

The CPU 41 counts the detection frequency of use in the time period which can be determined as the detection time period depending on the setting of the changeable time period in which the display can be turned off. This is stored as the use frequency information 4212. If the use is detected in the detection time period, the time period in which the display is turned off is set based on the detection frequency. The frequency of detection needs to be counted simply in the detection time period at that point, in order to make a comparison with the detection frequency in other time periods. Especially if there is no change in the time period in which the display is turned off for a long period of time, by obtaining a use history for all detection time periods which may be changed in response to the change in the setting time period in which the display is turned off, it is possible to reliably set the display to be turned off at the time period which is least used.

The CPU 41 calculates the use degree of the index regarding the detection frequency based on the added value weighted larger for the latest detection of use. The least used time period can be determined according to the latest use habits by the user. Therefore, the time period which was frequently used in the past and the time period frequently used in the present are suitably determined, and the time period in which the use while the display is turned off is hardly detected can be specified.

In the electronic watch 1a of the second embodiment, if the use of the electronic watch 1a is detected in the detection time period in a number of days, here, two consecutive days, the CPU 41 moves and sets the time period in which the display is turned off. The user may often irregularly use the electronic watch 1a at the time in which the electronic watch 1a is not normally used. If the time period in which the display is turned off is immediately changed according to such irregular use, this may be different from the optimal time period. Therefore, the time period in which the display is turned off is changed when the use is detected continuously a number of days and it is determined that the used time period changed as a habit. Therefore, when the use is exceptional and for only one day, the time period in which the display is turned off is maintained unchanged from the present suitable time period.

When the use of the electronic watch is detected in the detection time period, the CPU 41 delays the time period in which the display is turned off on the day of detection so that the start time of the detection time period is after the present time. That is, in cases such as in the electronic watch 1a of the second embodiment where there is only an irregular use and the normal setting of the time period in which the display is turned off is not changed or as in the electronic watch 1b of the third embodiment where the time period in which the display is turned off moves to an unspecified time period, as an exception on the day that the use is detected, the time period can be sequentially delayed according to the use detection timing similar to the electronic timepiece 1 of the first embodiment. With this, the time period in which the display is turned off can be reliably provided in the day in which the use is detected, and the burn-in of the display screen 11 can be suppressed more effectively.

If the time period in which the display is turned off cannot be delayed within the range of the third time period, the CPU 41 does not perform the setting of the time period in which the display is turned off on the day that the use is detected. If the time period in which the display is turned off cannot be delayed any later, there is no need to forcibly set the time period in which the display is turned off, and the time period can be suitably set the next day. There is no strict upper limit of the amount of time that the display can be continued in order to prevent burn-in, and there is no need to continue use detection in a time period in which the state that the user is not using the electronic watch is not expected to forcibly continue the processing.

The state in which the burn-in is prevented is the state in which the digital display is turned off. In the display apparatus such as the electronic watch in which it is normally difficult to turn off the display, the burn-in can be easily suppressed by simply turning off the display. The display driving action to initiatively prevent burn-in is not performed, and the power consumption does not increase.

The timekeeping circuit 48 (may be included in CPU 41) which counts the present time is provided, and the CPU 41 controls the display 43 to display the present time. That is, in the display apparatus such as the electronic watch in which the time is mainly displayed, normally it is difficult to erase the date/time display, and it is difficult to change the display position. In such display apparatus, by performing control regarding the display erasing action, the burn-in due to the display continuing in the same position for a long time can be suppressed without reducing the convenience for the user.

According to the display action control method of the display apparatus of the present embodiment, in a display screen in which pausing of the display is not normally assumed and in which it is difficult to move the fixed displayed contents, the display of the display screen is turned off during an amount of time at a timing that the user does not use the display, for example, at night. With this, the burn-in can be prevented while satisfying the needs of the user for continuing display without reducing the convenience. The time period which is not used by the user is different for each user. Moreover, the habits of the users may change and the display may be used irregularly in time periods in which the display apparatus is not normally used. Therefore, the display is returned to the normal display immediately when the use is detected and the time period in which the burn-in prevention state is set can be changed.

The present invention is not limited to the above embodiments and various modifications are possible. For example, according to the present embodiment, the detection of no use is performed for one hour before the time period in which the displays is turned off, but there is no need to set the time to one hour. Moreover, if the user is not using the electronic watch in the time period in which the display is turned off, that is, if the time period in which the display is turned off is set avoiding the time period in which use is detected right before, on that day, or within a recent term (one week), the electronic watch can be used until right before the time period. The time period in which the display is turned off from the next day and after can be set after ending the detection time period.

According to the present embodiment, the time period in which the display is turned off is set in a unit of one hour. However, if the used state is detected during the detection time period for whether there is no use, the time period in which the display is turned off can be delayed so that the display is turned off one hour later from the timing when the used state was last detected.

When the used state is detected while the display is turned off and the display state is returned (including when the display state is returned from the off state a plurality of times in one day), the display action can be continued without stopping for that day depending on the total amount of time that the display is turned off for that day. In this case, the setting time period is delayed only for the next day and after (including moving to the nighttime of the next day).

According to the present embodiment, the display can be turned off only between 0:30 to 5:30, but the time does not have to be limited to the above. The setting can allow the display to be turned off any time throughout 24 hours. Alternatively, the user can change the setting determining whether the display can be turned off at any time throughout 24 hours.

According to the second embodiment, the setting time period is changed when the use is detected in the detection time period for two consecutive days. However, the number of consecutive days is not limited to two days. Alternatively, the detection is not limited to continuous detection, and for example, other conditions can be employed such as two times or more within three days or a number of times or more within one week.

Alternatively, the setting to move the time period may include the condition to detect the use for two consecutive days only when the time period in which the display is turned off is delayed for a large amount of time at once, for example, two hours or more so as to consider the possibility of irregular use. In this case, normally, the setting to move the time period in which the display is turned off can be performed with detection of use for one day.

According to the third embodiment, the use detection frequency is stored in the unit of one day, and the use frequency is calculated based on the information of the use detection frequency in the unit of one week, but the use detection frequency can be changed in the unit of one week. That is, instead of counting the latest seven days, the use detection frequency can be counted for one week from a specific fixed day of the week, and the information for the latest two weeks can be stored. That is, at the start of the specific day of the week, the value of the use detection frequency of "one week" is changed to the use detection frequency of "two weeks before", and the values of the use detection frequency of "one week" are all initialized to zero. With this, the data amount of the use frequency information 4212 can be decreased.

The calculating method of the use degree and the setting method of weighting is not limited to those shown in the above embodiment. For example, all of the number of detections from two weeks before and thereafter can include accumulative values, and all of the values other than the number of detections for that day can be included in the accumulative values. In this case, the coefficient is multiplied a number of times equal to the number of days that passed (power of) to obtain the weighted coefficient. Alternatively, only the use detection frequency in a term, for example, within two weeks, may be stored, and the old data of the use detection frequency may be discarded and not considered.

According to the present embodiment, two examples are shown, the time period in which the display is turned off may be simply delayed in a unit of one hour or two hours, or the time period in which use is at the minimum is set based on the use frequency information. However, the present invention is not limited to the above. For example, when the use is detected, the time period in which the display is turned off may be returned to the setting time period of the default setting once the next day, then reset to the suitable time period.

According to the second embodiment and the third embodiment, the delay on that day and the moved setting for the next day and thereafter are differently set, but the delay on that day does not have to be separately performed. In this case, the setting may be changed so that the display is turned off in a totally different time period in that day, and if it already past the time period to which the setting is moved, the display may not be turned off on the day of the use detection.

The contents of the processes shown in the first embodiment to the third embodiment can be freely combined as long as they are not mutually exclusive. For example, if the use is detected in the detection time period for two consecutive days based on the second embodiment, setting to move the time period in which the display is turned off can be performed to move the time period to the time period in which the use degree is the minimum based on the third embodiment.

According to the above-described embodiments, setting change are all performed automatically. Alternatively, the user can perform a input operation to be able to confirm the present setting of the time period in which the display is turned off or can operate an instruction to return the setting of the time period in which the display is turned off to the original setting (default setting). Further, when the setting to move the time period in which the display is turned off is performed, the alert display can be performed thereafter for a term. Alternatively, the electronic watch can include the communicating unit. When communication by short range wireless communication with external devices is possible, the display and/or the manual setting of the time period in which the display is turned off can be performed by only the external device with which communication is established.

According to the present embodiment, the control action regarding erasing the display is performed by the CPU 41 with software. Alternatively, a plurality of CPUs can perform the control process, or some of the processes can be performed by hardware such as dedicated logical circuits.

According to the present embodiment, the digital display screen of the electronic clock is described as the example. Alternatively, the present invention may be various display apparatuses including a digital display screen which basically continuously displays a status without the display being erased.

Further, specific details such as the configuration, displayed contents, contents and procedures of the display process which are shown in the embodiments can be suitably modified without leaving the scope of the present invention.

Although various embodiments of the present invention are described, the scope of the present invention is not limited to the above-described embodiments, and the present invention includes the scope as described in the attached claims and its equivalents.

This application is based upon and claims the benefit of priority from the prior Japanese Patent Application No. 2019-166964, filed on Sep. 13, 2019 the entire contents of which are incorporated herein by reference.

What is claimed is:

1. A display apparatus comprising:
a display which performs digital display;
a sensor which detects use of the display apparatus by a user; and
a memory in which a detection frequency showing a frequency that the use is detected in a certain time period is stored corresponded with each of a plurality of time periods;
at least one processor,
wherein,
the processor performs a display control process in which the digital display of the display is set to be in a burn-in prevention state in a set first time period, and
when the use is detected between a time a predetermined amount of time before a start time of the first time period and a stop time of the first time period, the processor performs a setting process in which the first time period is set to be changed to any time period among the plurality of time periods based on the detection frequency stored in the memory.

2. The display apparatus according to claim 1, wherein the processor sets the first time period within a range of the plurality of time periods in the setting process.

3. The display apparatus according to claim 1, wherein, in the setting process, the processor uses a length of the first time period as a unit to determine an amount of time that the first time period is moved.

4. The display apparatus according to claim 1, wherein, in the setting process, the processor sets the first time period to be changed to a time period later than the first time period among the plurality of time periods when the use is detected between the time the predetermined amount of time before the start time of the first time period and the stop time of the first time period.

5. The display apparatus according to claim 4, wherein, in the setting process, the processor sets the first time period to be changed to a time period that is first among the plurality of time periods when there is no time period later than the first time period among the plurality of time periods.

6. The display apparatus according to claim 1, wherein, the processor performs an update process in which the detection frequency regarding the time period corresponding to the timing of detection among the plurality of time periods is updated when the use is detected updated between the time the predetermined amount of time before the start time of the first time period and the stop time of the first time period.

7. The display apparatus according to claim 6, wherein, in the update process, the processor calculates an index regarding the detection frequency based on an added value weighting the more recent detection of use to be heavier.

8. The display apparatus according to claim 6, wherein the processor performs the update process before performing the setting process when the use is detected between the time the predetermined amount of time before the start time of the first time period and the stop time of the first time period.

9. The display apparatus according to claim 1, wherein, in the setting process, the processor the processor sets the first time period to be changed to any of the plurality of time periods among the plurality of time periods when the use is detected between the time the predetermined amount of time before the start time of the first time period and the stop time of the first time period consecutively for a predetermined number of days.

10. The display apparatus according to claim 1 wherein the burn-in prevention state is a state in which the digital display is turned off.

11. The display apparatus according to claim 1, further comprising a timekeeper which counts present time, wherein, in the display control process, the processor controls the display to display the present time.

12. The display apparatus according to claim 1, wherein, in the setting process, the processor sets the first time period to be changed to a time period with the smallest detection frequency among the plurality of time periods based on the detection frequency stored in the memory when the use is detected between the time the predetermined amount of time before the start time of the first time period and the stop time of the first time period.

13. A display action control method of a display apparatus including a display which performs digital display, a sensor which detects use of an apparatus by a user, and a memory in which a detection frequency showing a frequency that the use is detected in a certain time period is stored corresponded with each of a plurality of time periods, the method comprising:
controlling a digital display of the display to be set to a burn-in prevention state in a set first time period; and
when the use is detected between a time a predetermined amount of time before a start time of the first time period and a stop time of the first time period, performing a setting in which the first time period is set to be changed to any time period among the plurality of time periods based on the detection frequency stored in the memory.

14. A non-transitory computer readable storage medium having a program stored thereon for controlling a processor in a display apparatus including a display which performs digital display, a sensor which detects use of an apparatus by a user, and a memory in which a detection frequency showing a frequency that the use is detected in a certain time period is stored corresponded with each of a plurality of time periods, the program configured to control the processor to:
perform a display control process in which the digital display of the display is set to a burn in prevention state in a set first time period; and
when the use is detected between a time a predetermined amount of time before a start time of the first time period and a stop time of the first time period, perform a setting process in which the first time period is set to be changed to any time period among the plurality of time periods based on the detection frequency stored in the memory.

\* \* \* \* \*

UNITED STATES PATENT AND TRADEMARK OFFICE
CERTIFICATE OF CORRECTION

PATENT NO. : 11,402,896 B2
APPLICATION NO. : 17/015984
DATED : August 2, 2022
INVENTOR(S) : Tadashi Kurihara It is certified that error appears in the above-identified patent and that said Letters Patent is hereby corrected as shown below:

In the Claims

Column 15, Claim 9, Line 4:
"the setting process, the processor the processor sets the first time period" should read: --the setting process, the processor sets the first time period--.

Signed and Sealed this
Twentieth Day of December, 2022

Katherine Kelly Vidal
*Director of the United States Patent and Trademark Office*